United States Patent
Lim et al.

(10) Patent No.: US 10,411,755 B2
(45) Date of Patent: Sep. 10, 2019

(54) METHOD OF SHARING SPECTRUM BY FREQUENCY HOPPING AND COMMUNICATION SYSTEM USING THE SAME

(71) Applicant: AJOU UNIVERSITY INDUSTRY-ACADEMIC COOPERATION FOUNDATION, Suwon-si, Gyeonggi-do (KR)

(72) Inventors: Jaesung Lim, Suwon-si (KR); Hoki Baek, Suwon-si (KR); Seonjoo Choi, Sokcho-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 0 days.

(21) Appl. No.: 15/941,108

(22) Filed: Mar. 30, 2018

(65) Prior Publication Data

US 2018/0302118 A1 Oct. 18, 2018

(30) Foreign Application Priority Data

Apr. 18, 2017 (KR) ........................ 10-2017-0049953
Mar. 22, 2018 (KR) ........................ 10-2018-0033456

(51) Int. Cl.
*H04B 1/69* (2011.01)
*H04B 1/707* (2011.01)
(Continued)

(52) U.S. Cl.
CPC ......... *H04B 1/7136* (2013.01); *H04B 1/7143* (2013.01); *H04W 16/14* (2013.01); *H04B 2001/71362* (2013.01)

(58) Field of Classification Search
CPC ............... H04B 1/7136; H04B 1/7143; H04B 2001/71362; H04B 1/715; H04W 16/14
(Continued)

(56) References Cited

U.S. PATENT DOCUMENTS

2011/0103428 A1* 5/2011 Chan ................. H04B 1/715
375/133

FOREIGN PATENT DOCUMENTS

KR 10-2011-0076181 A 7/2011

OTHER PUBLICATIONS

Joo-Pyoung Choi et al., "Study on Cognitive Engine Platform Based on the Spectrum Sharing for the Military Tactical Communications", The Journal of Korean Institute of Electromagnetic Engineering and Science, Jul. 2016, pp. 599-611, vol. 27, No. 7
(Continued)

*Primary Examiner* — Phuong Phu
(74) *Attorney, Agent, or Firm* — Sughrue Mion, PLLC

(57) ABSTRACT

A method of sharing a spectrum by frequency hopping includes receiving frequency usage information for a shared spectrum of a first communication system, setting a weight for determining a ratio of channels to be used for communication by frequency hopping of a second communication system from among first channels of the second communication system corresponding to an unused spectrum in the shared spectrum and second channels of the second communication system corresponding to a used spectrum in the shared spectrum, based on the received frequency usage information, and selecting a frequency hopping channel from among the first channels and the second channels based on the set weight.

14 Claims, 12 Drawing Sheets

(51) Int. Cl.
      *H04B 1/713*     (2011.01)
      *H04B 1/7136*   (2011.01)
      *H04W 16/14*    (2009.01)
      *H04B 1/7143*   (2011.01)

(58) Field of Classification Search
      USPC ................................................. 375/132–135
      See application file for complete search history.

(56) References Cited

OTHER PUBLICATIONS

Jong-Min Park et al., "Long-Term and Short-Term Analysis of Compatibility Between Satellite Earth Station and Terrestrial Fixed System in X-Band", ICTC 2014, pp. 579-584.

Notice to Submit Response dated Aug. 14, 2017, issued by the Korean Patent Office in counterpart Korean Patent Application No. 10-2017-0049953.

\* cited by examiner $Ch_{SAT,I}$ = 4 and 8 ( $\alpha$ = 0, $\beta$ = 0)

METHOD OF SHARING SPECTRUM BY FREQUENCY HOPPING AND COMMUNICATION SYSTEM USING THE SAME

CROSS REFERENCE TO RELATED APPLICATIONS

This application claims priority from Korean Patent Application No. 10-2017-0049953, filed on Apr. 18, 2017, and Korean Patent Application No. 10-2018-0033456, filed on Mar. 22, 2018, in the Korean Intellectual Property Office, the contents of which are incorporated herein by reference in their entireties.

BACKGROUND

1. Field

One or more embodiments relate to a method of sharing a spectrum by frequency hopping and a communication system using the method, and more particularly, to a method of sharing a spectrum by frequency hopping in which a second communication system may effectively set a selection criterion of a channel to be used for communication by frequency hopping based on frequency usage information for a shared spectrum of a first communication system, and a communication system using the method.

2. Description of the Related Art

Recently, various communication services by Internet of Things (IOT), drones, etc. have emerged, and frequency allocation for providing new communication services is continuously required.

However, frequency resources are limited and most spectrums are already being used in existing communication services.

SUMMARY

One or more embodiments include a method of sharing a spectrum by frequency hopping and a communication system using the method, and more particularly, to a method of sharing a spectrum by frequency hopping in which a second communication system may effectively set a selection criterion of a channel to be used for communication by frequency hopping based on frequency usage information for a shared spectrum of a first communication system, and a communication system using the method.

Additional aspects will be set forth in part in the description which follows and, in part, will be apparent from the description, or may be learned by practice of the presented embodiments.

According to one or more embodiments, a method of sharing a spectrum by frequency hopping may include receiving frequency usage information for a shared spectrum of a first communication system, setting a weight for determining a ratio of channels to be used for communication by frequency hopping of a second communication system from among first channels of the second communication system corresponding to an unused spectrum in the shared spectrum and second channels of the second communication system corresponding to a used spectrum in the shared spectrum, based on the received frequency usage information and selecting a frequency hopping channel from among the first channels and the second channels based on the set weight.

In some embodiments, the first communication system is a communication system for providing a fixed satellite service (FSS), and the shared spectrum is an X-band spectrum.

In some embodiments, the second communication system is a communication system for providing a tactical data link (TDL).

In some embodiments, the shared spectrum of the first communication system comprises satellite channels for satellite communication of the first communication system and guard bands for preventing interference between the satellite channels.

In some embodiments, the frequency usage information comprises information on a busy satellite channel and an idle satellite channel from among the satellite channels.

In some embodiments, the unused spectrum in the shared spectrum of the first communication system comprises the guard bands and the idle satellite channel from among the satellite channels, and the used spectrum in the shared spectrum of the first communication system comprises the busy satellite channel from among the satellite channels.

In some embodiments, the setting of the weight comprises initially setting the weight to correspond to a ratio of the number of the first channels to the number of the second channels.

In some embodiments, the method further comprising measuring a performance index according to spectrum sharing of the second communication system based on the initially set weight and updating the weight whether the measured performance index meets a reference performance index required in the second communication system.

In some embodiments, the performance index comprises the number of multi-nets required in the second communication system.

In some embodiments, wherein the performance index comprises the number of the multi-nets required in the second communication system and a message error rate (MER).

In some embodiments, the updating of the weight comprises updating the weight to increase a value of the weight.

In some embodiments, wherein, as the weight is updated to increase the value of the weight, the selecting of a frequency hopping channel from among the first channels and the second channels is set such that a ratio of selecting the first channels as the frequency hopping channel is increased.

According to one or more embodiments, a communication system for sharing a spectrum of another communication system by frequency hopping, the communication system configured to receive frequency usage information for the shared spectrum of the other communication system, to set a weight for determining a ratio of channels to be used by frequency hopping from among first channels corresponding to an unused spectrum in the shared spectrum and second channels corresponding to a used spectrum in the shared spectrum based on the received frequency usage information, and to select a frequency hopping channel from among the first channels and the second channels based on the set weight.

In some embodiments, the other communication system is a communication system for providing a fixed satellite service (FSS), and the shared spectrum is an X-band spectrum.

In some embodiments, the communication system is a communication system for providing a tactical data link (TDL) comprising a multi-net.

According to one or more embodiments, the method of sharing a spectrum by frequency hopping may include receiving frequency usage information for a shared spectrum of a first communication system, setting a weight at which a sum of a signal collision probability in first channels of a second communication system corresponding to an unused spectrum in the shared spectrum and a signal collision probability in second channels of the second communication system corresponding to a used spectrum in the shared spectrum is minimized based on the received frequency usage information, and selecting a frequency hopping channel from among the first channels and the second channels based on the set weight.

In some embodiments, the frequency usage information may include a ratio of idle slots not used by the first communication system in the shared spectrum, and a ratio of idle duration in a slot being used by the first communication system in the shared spectrum.

In some embodiments, the method of sharing a spectrum by frequency hopping may further include modeling a signal collision probability model based on the frequency usage information.

In some embodiments, the signal collision probability model may include the sum of the signal collision probability in the first channels of the second communication system corresponding to the unused spectrum in the shared spectrum and the signal collision probability in the second channels of the second communication system corresponding to the used spectrum in the shared spectrum.

In some embodiments, the signal collision probability in the second channels may be a sum of a signal collision probability at busy duration in a slot being used by the first communication system in the used spectrum of the shared spectrum, a signal collision probability at idle duration in a slot being used by the first communication system in the used spectrum of the shared spectrum, and a signal collision probability in a slot not being used by the first communication system in the used spectrum of the shared spectrum.

In some embodiments, the method of sharing a spectrum by frequency hopping may further include linear approximating the signal collision probability model.

In some embodiments, the setting of the weight may set a value of the weight to an upper limit value if the value of the weight exceeds the upper limit value.

In some embodiments, the selecting of the frequency hopping channel may select the frequency hopping channel from among the first channels and the second channels according to a result of comparison between a uniform random variable according to uniform distribution having uniform probability distribution between 0 and 1 and the weight.

In some embodiments, the selecting of the frequency hopping channel may select an arbitrary first channel by applying an identical probability to each of the first channels when the frequency hopping channel is selected from among the first channels, and an arbitrary second channel by applying an identical probability to each of the second channels when the frequency hopping channel is selected from among the second channels.

According to one or more embodiments, the communication system for sharing a shared spectrum of another communication system by frequency hopping may receive frequency usage information for the shared spectrum of the other communication system, setting a weight at which a sum of a signal collision probability in first channels corresponding to an unused spectrum in the shared spectrum and a signal collision probability in second channels corresponding to a used spectrum in the shared spectrum is minimized based on the received frequency usage information, and select a frequency hopping channel from among the first channels and the second channels based on the set weight.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
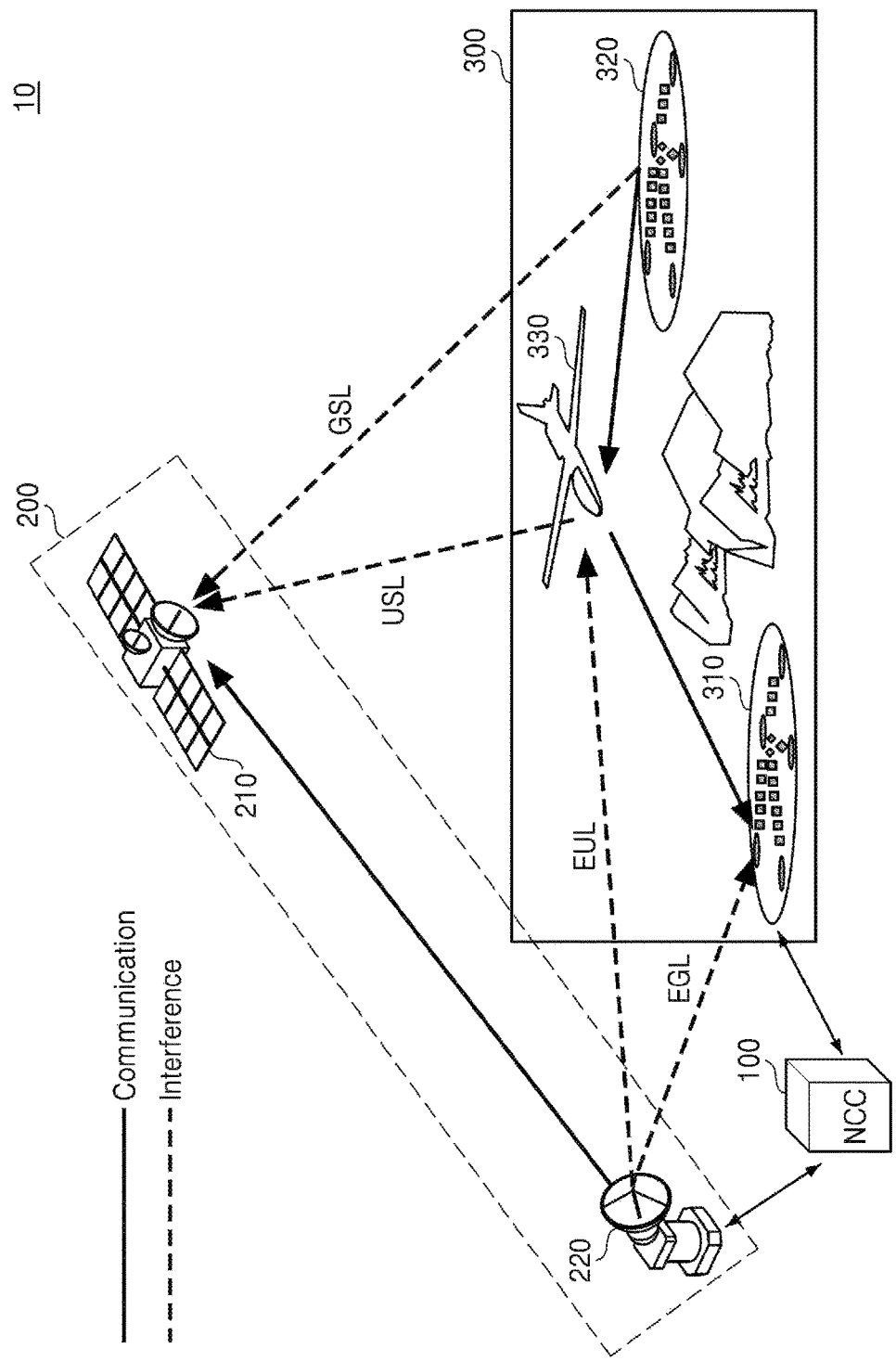
FIG. 1 is a conceptual diagram of a total communication system according to an embodiment of the present disclosure.

The inventive concept may be variously modified and have various example embodiments, so that specific example embodiments will be illustrated in the drawings and described in the detailed description. However, this does not limit the inventive concept to specific example embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the inventive concept. In addition, numeral figures (for example, 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, each processes may be performed by hardware such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software in a system. Furthermore, the system may include a memory that stores data necessary for processing at least one function or operation.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

Hereinafter, example embodiments of the inventive concept will be described in detail.

FIG. 1 is a conceptual diagram of a total communication system according to an embodiment of the present disclosure.

Referring to FIG. 1, a total communication system 10 sharing a spectrum may include a network control center (NCC) 100, a first communication system 200, and a second communication system 300.

The NCC 100 may monitor frequency usage information for the first communication system 200 and may transmit the monitored frequency usage information to the second communication system 300.

In FIG. 1, the NCC 100 is separated from the first communication system 200 and the second communication system 300 for convenience of explanation. However, the NCC 100 may be included in the first communication system 200 or the second communication system 300.

The first communication system 200 is a communication system providing a shared spectrum that is a subject of spectrum sharing.

The first communication system 200 includes a satellite 210 and an earth station (ES) 220 and may be implemented as a communication system for providing a fixed satellite service (FSS) according to an embodiment.

According to an embodiment, the shared spectrum of the first communication system 200 may be an X-band spectrum (e.g., 7.9 GHz to 8.4 GHz).

The second communication system 300 may receive the frequency usage information for the first communication system 200 received from the NCC 100 and may set a selection criterion for selecting a channel to be used for communication in the shared spectrum by frequency hopping based on the received frequency usage information.

The second communication system 300 may utilize a portion of the shared spectrum of the first communication system 200 by performing frequency hopping using a frequency hopping pattern generated according to the set selection criterion.

The second communication system 300 may include a plurality of ground networks 310 and 320 and a relay station 330 such as an unmanned aerial vehicle (UAV).

The plurality of ground networks 310 and 320 may communicate with each other and the relay station 330 may be utilized for communication between the plurality of ground networks 310 and 320 to prevent communication from being limited by terrain constraints existing between the plurality of ground networks 310 and 320.

A distance between the ES 220 and the ground networks 310 and 320 or a distance between the ES 220 and the relay station 330 is shorter than a distance between the satellite 210 and the ES 220. Further, intensity of a signal for communication between the ground networks 310 and 320 and the relay station 330 is never weak. Therefore, when a downlink spectrum of the first communication system 200 is provided as a shared spectrum, considerable communication interference between the first communication system 200 and the second communication system 300 may occur.

According to an embodiment, an uplink spectrum of the first communication system 200, for example, an X-band uplink spectrum, may be provided as a shared spectrum. Also in this case, as shown in FIG. 1, communication interference may occur between the relay station 330 and the satellite 210 (USL), between the ground network 320 and the satellite 210 (GSL), between the ES 220 and the relay station 330 (EUL), and between the ES 220 and the ground network 310 (EGL). However, the communication interference may be relatively less than when a downlink spectrum is provided as a shared spectrum.

Figure 2:
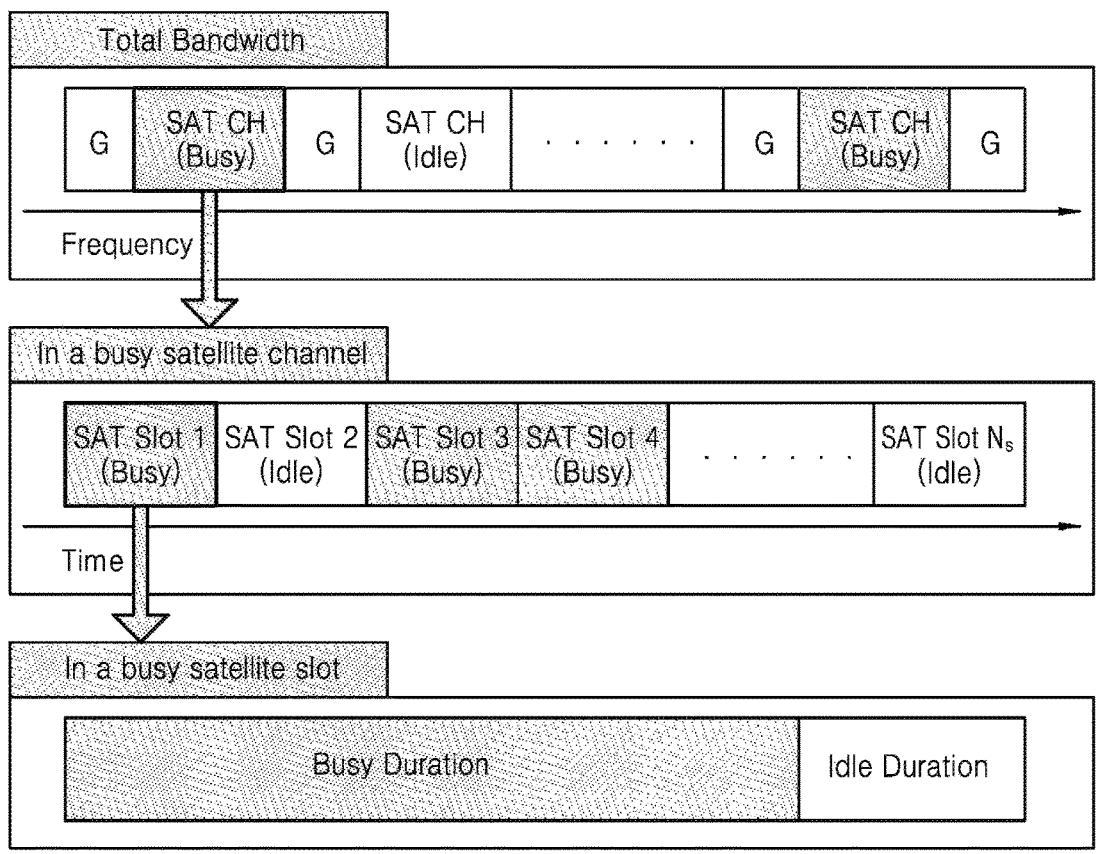
FIG. 2 is a view of usage of a shared spectrum of a first communication system of FIG. 1.

FIG. 2 is a view of usage of a shared spectrum of a first communication system of FIG. 1.

Referring to FIGS. 1 and 2, a total bandwidth of the shared spectrum of the first communication system 200 may include a plurality of satellite channels SAT CH and guard bands G for preventing interference between the plurality of satellite channels SAT CH.

The plurality of SAT CH may include a busy satellite channel which is actually being used for satellite communication of the first communication system 200 and an idle satellite channel which is not being used.

Furthermore, even in the busy satellite channel being used for satellite communication of the first communication system 200, a plurality of slots SAT slot 1 to SAT slot Ns include busy slots which are being used (e.g., SAT slot 1, SAT slot 3, SAT slot 4, and the like) and idle slots which are not being used (e.g., SAT slot 2, SAT slot Ns, and the like).

Also, a busy slot (e.g., SAT slot 1) includes busy duration being used and idle duration not being used.

The guard bands G in the shared spectrum of the first communication system 200, the idle slot in the busy satellite channel, and the idle duration in the busy slot may correspond to an unused spectrum. The frequency usage information for the first communication system 200 may include information on at least one of the busy satellite channel, the idle satellite channel, the busy slot and idle slot in the busy satellite channel, and the busy duration and the idle duration in the busy slot.

Figure 3:
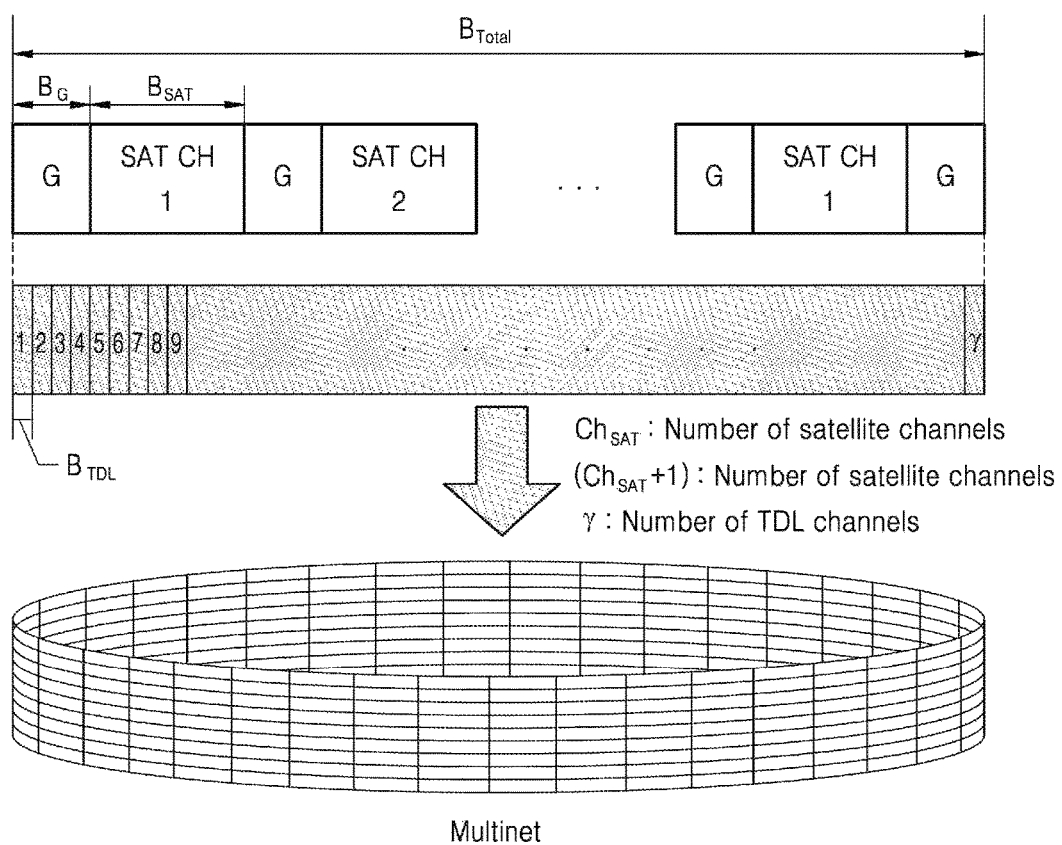
FIG. 3 is a view of a relationship in which the shared spectrum of the first communication system of FIG. 2 is shared by a second communication system.

FIG. 3 is a view of a relationship in which a shared spectrum of a first communication system of FIG. 2 is shared by a second communication system.

Referring to FIGS. 1 to 3, a total bandwidth Btotal of the shared spectrum of the first communication system 200 may be denoted according to the following Equation 1.

$$B\text{Total} = B\text{SAT} * \text{ChSAT} + BG * (\text{ChSAT} + 1) \qquad [\text{Equation 1}]$$

(BSAT is a bandwidth of a satellite channel of the first communication system 200, ChSAT is the number of total satellite channels, and BG is a bandwidth of guard bands)

Also, γ channels of the second communication system 300, each having a bandwidth of BTDL, may be allocated to correspond to the shared spectrum of the first communication system 200 as shown in FIG. 3.

According to an embodiment, first channels of the second communication system 300 are allocated to correspond to an unused spectrum (e.g., guard bands, an idle satellite channel not in use, etc.) in the shared spectrum of the first communication system 200, and second channels of the second communication system 300 may be allocated to correspond to a used spectrum (e.g., a busy satellite channel in use, etc.) in the shared spectrum of the first communication system 200. In this case, the number of the first channels may be defined as γI, and the number of the second channels may be defined as γB. γI and γB may have a relationship of the following Equation 2, Equation 3, and Equation 4.

$$\gamma I = \gamma G^*(\text{ChSAT}+1) + \gamma \text{SAT}^* \text{ChSAT}, I \quad \text{[Equation 2]}$$

(γG=BG/BTDL, γSAT=BSAT/BTDL, ChSAT,I is the number of idle satellite channels not in use)

$$\gamma B = \gamma \text{SAT}^* \text{ChSAT}, B \quad \text{[Equation 3]}$$

(ChSAT,B is the number of busy satellite channels in use)

$$\gamma = \gamma I + \gamma B \quad \text{[Equation 4]}$$

According to an embodiment, the second communication system 300 may operate a multi-net utilizing the shared spectrum of the first communication system 200. Each network of the second communication system 300 may use channels allocated to the shared spectrum of the first communication system 200 by frequency hopping.

Figure 4:
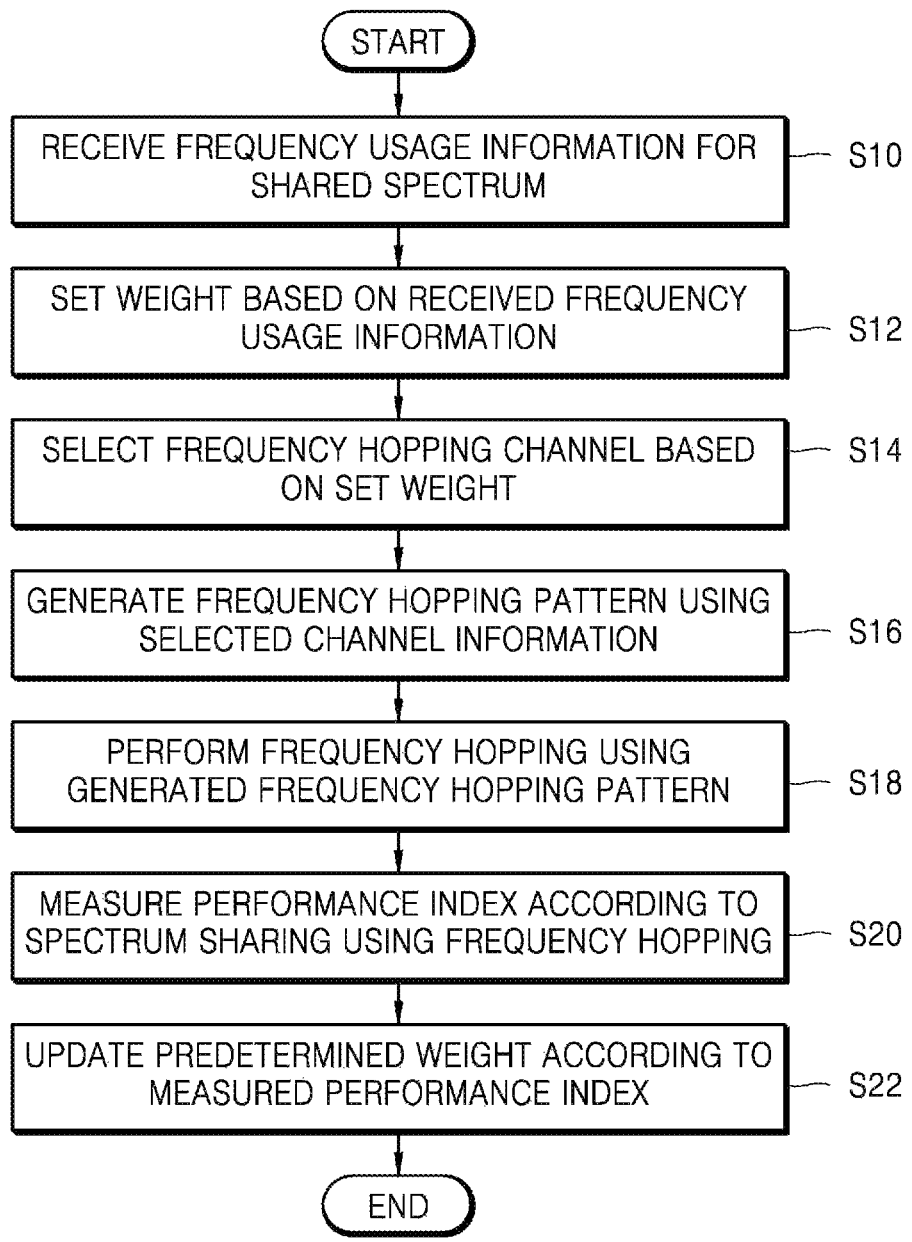
FIG. 4 is a flowchart of a method of sharing a spectrum by frequency hopping according to an embodiment of the present disclosure.
Figure 5:
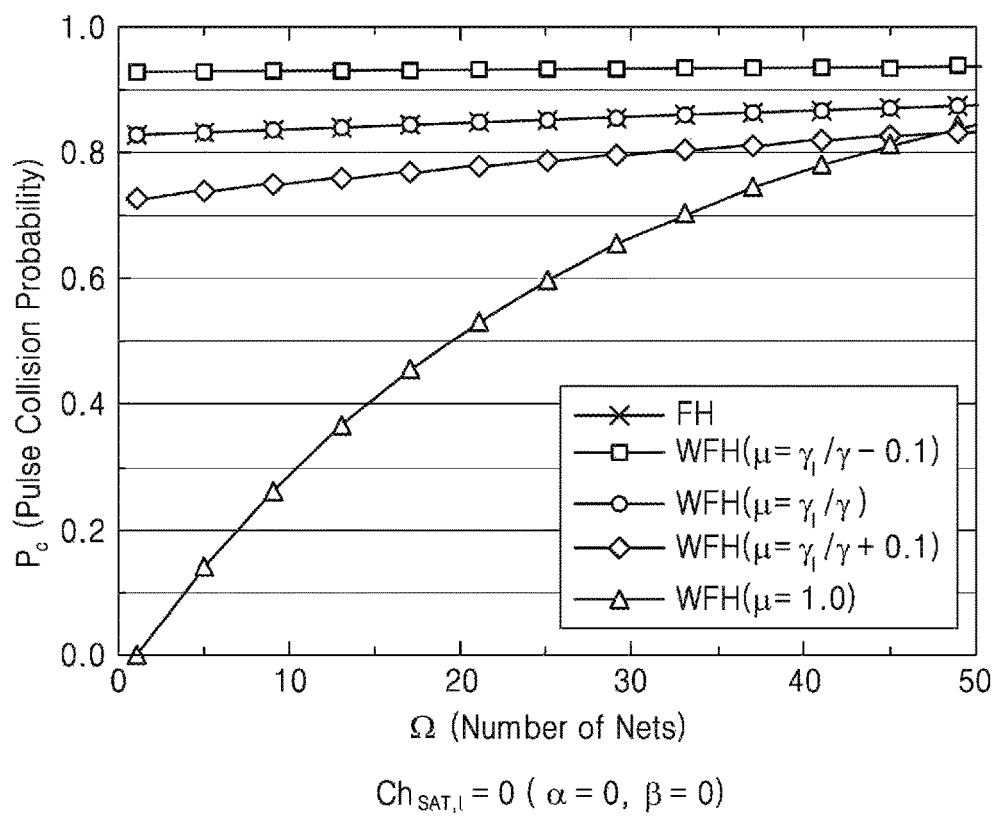
FIGS. 5 to 10 are graphs showing comparison of collision probabilities in a channel according to the number of nets according to various setting conditions, in a communication system according to an embodiment of the present disclosure.
Figure 6:
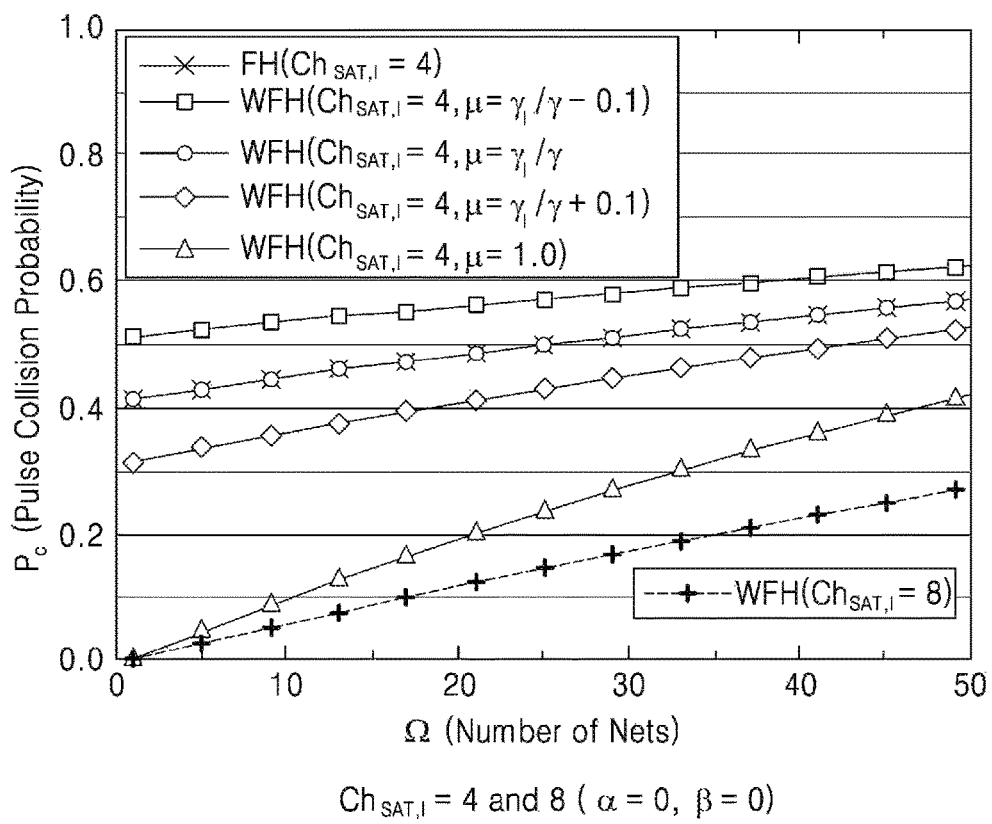
Figure 7:
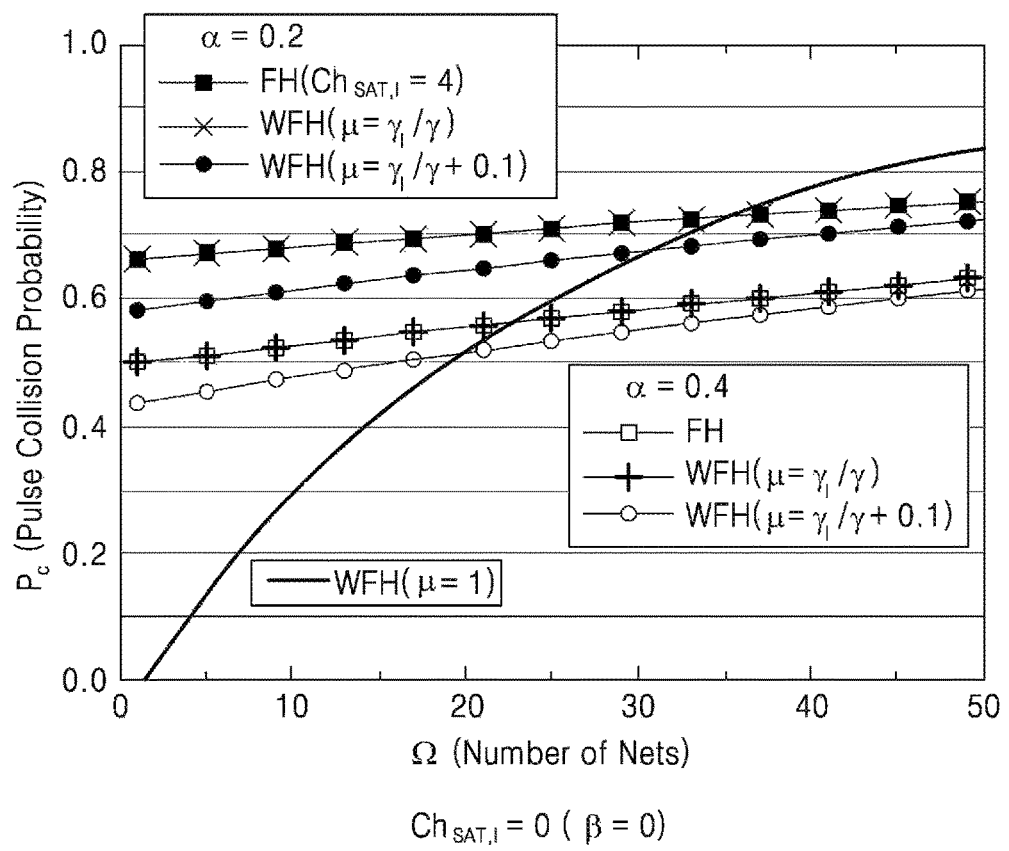
Figure 8:
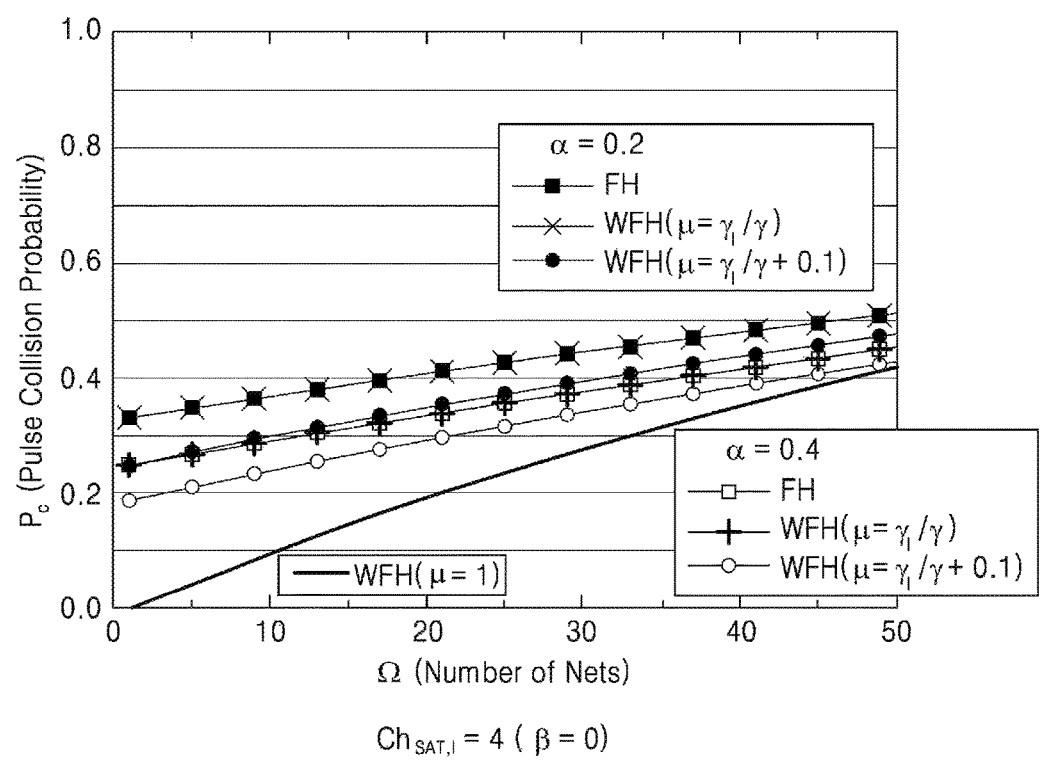
Figure 9:
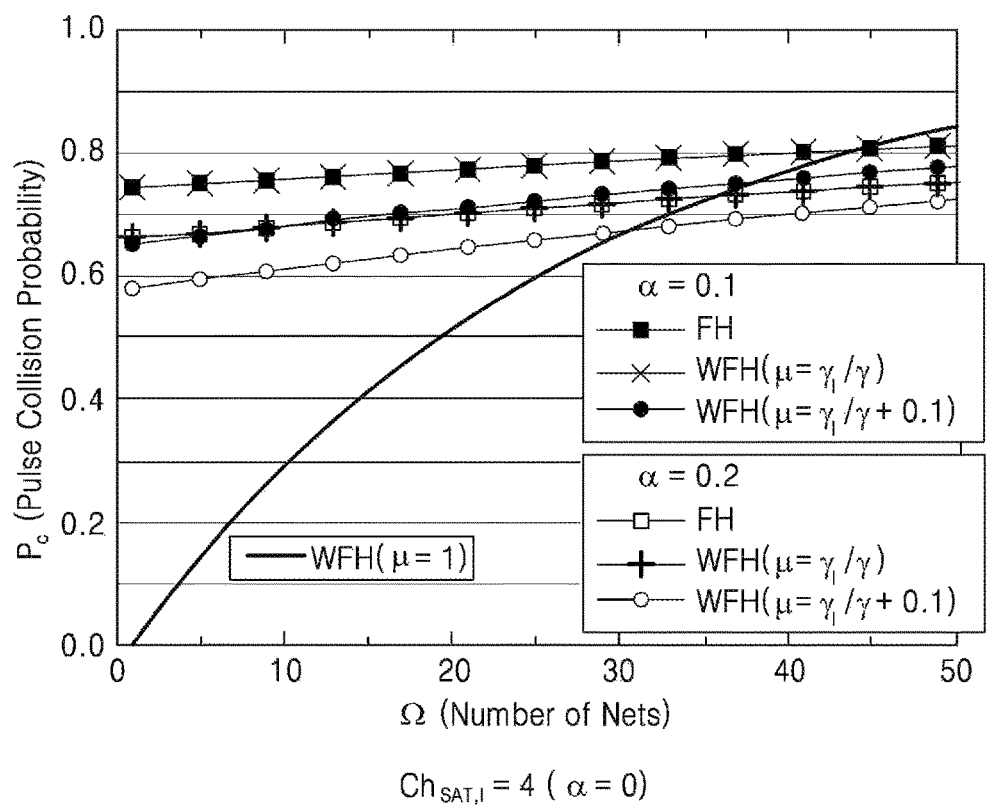
Figure 10:
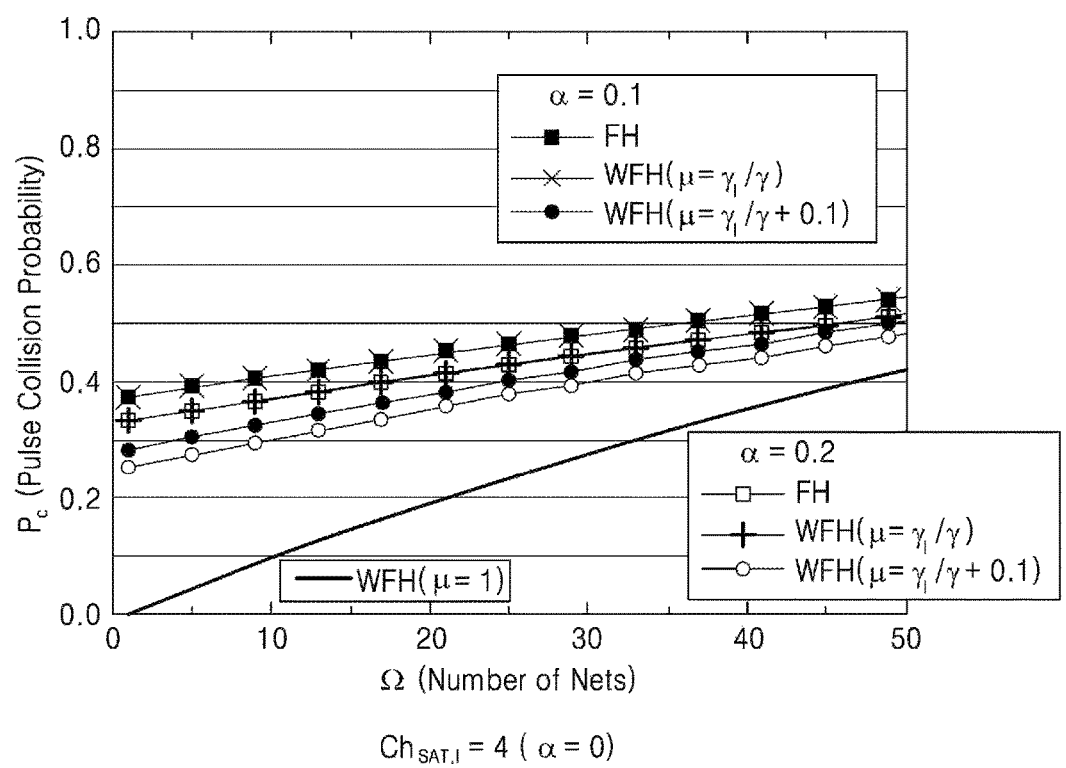

FIG. 4 is a flowchart of a method of sharing a spectrum by frequency hopping according to an embodiment of the present disclosure.

Referring to FIGS. 1 to 4, the NCC 100 may monitor frequency usage information for the first communication system 200 and may transmit the monitored frequency usage information to the second communication system 300.

In operation S10, the second communication system 300 may receive frequency usage information for the shared spectrum of the first communication system 200 received from the NCC 100.

In operation S12, the second communication system 300 may set a weight based on the received frequency usage information.

The weight may refer to a reference value for determining a ratio of channels to be used for communication by frequency hopping from among the first channels of the first communication system 300 corresponding to an unused spectrum of the shared spectrum of the first communication system 200 and the second channels of the second communication system 300 corresponding to a used spectrum of the shared spectrum.

The weight may refer to a probability that the second communication system 300 uses the first channels from among the first channels and the second channels for communication by frequency hopping.

According to an embodiment, the higher a value of the weight set in the second communication system 300 (e.g., as the value of the weight approaches 1), the higher the probability that the second communication system 300 performs frequency hopping with the first channel. The lower the value of the weight (e.g., as the value of the weight approaches 0), the higher the probability that the second communication system 300 performs frequency hopping with the second channel.

According to an embodiment, the second communication system 300 may initially set a weight to correspond to a ratio of the number of the first channels of the second communication system 300 corresponding to the unused spectrum of the shared spectrum of the first communication system 200 to the number of the second channels of the second communication system 300 corresponding to the used spectrum of the shared spectrum. In this case, the weight may be initially set according to the following Equation 5.

$$\mu = \gamma I / (\gamma I + \gamma B) \quad \text{[Equation 5]}$$

(μ is a weight, γI is the number of first channels, and γB is the number of second channels)

In operation S14, the second communication system 300 may select a frequency hopping channel based on the weight set in operation S12.

According to an embodiment, the second communication system 300 may generate an arbitrary variable x between 0 and 1 having uniform distribution, compare the generated variable x with a set value of a weight, and select a channel to be used for communication by frequency hopping from among the first channels and the second channels according to a result of the comparison.

For example, when the generated variable x is less than the set value of the weight, the second communication system 300 may select any one of the first channels as a frequency hopping channel, and when the generated variable x is equal to or greater than the set value of the weight, the second communication system 300 may select any one of the second channels as a frequency hopping channel.

In operation S16, the second communication system 300 may generate a frequency hopping pattern using channel information selected in operation S14.

According to an embodiment, the second communication system 300 may repeat operation S14 until the frequency hopping pattern reaches a reference length required in the second communication system 300. And the second communication system 300 may add the selected channel information to the frequency hopping pattern to generate the frequency hopping pattern by repeating operation S14.

In operation S18, the second communication system 300 may perform frequency hopping with a shared spectrum of the first communication system 300 using the frequency hopping pattern generated in operation S16.

In operation S20, when communication is performed according to spectrum sharing using the frequency hopping in operation S18, the second communication system 300 may measure a performance index accordingly.

According to an embodiment, the performance index may include at least one of the number of multi-nets required in the second communication system 300 and a message error rate (MER).

According to an embodiment, the performance index may indicate the number of multi-nets when the MER has a certain value (e.g., 1%) or less.

In operation S22, the second communication system 300 may compare the performance index measured in operation S20 with a reference performance index required in the second communication system 300, and update a predetermined weight according to a result of the comparison.

The second communication system 300 may maintain the predetermined weight without updating the predetermined weight if the performance index measured in operation S20 meets the reference performance index required in the second communication system 300.

The second communication system 300 may update the predetermined weight if the performance index measured in operation S20 does not meet the reference performance index required in the second communication system 300.

According to an embodiment, the second communication system 300 may update the weight to increase a value of the predetermined weight.

For example, the second communication system 300 may update the weight according to the following Equation 6.

$$\mu' = \mu + 1/(\gamma I + \gamma B) = \mu + 0.1 \quad \text{[Equation 6]}$$

(μ' is an updated weight, and μ is a predetermined weight)

According to an embodiment, operations S20 and S22 may be repeated until the measured performance index meets the reference performance index, such that the weight may be updated repetitively.

According to an embodiment, operations S10 to S22 may be performed by the NCC 100.

FIGS. 5 to 10 are graphs showing comparison of collision probabilities in a channel according to the number of nets according to various setting conditions, in a communication system according to an embodiment of the present disclosure.

FIGS. 5 to 10 show graphs of a collision probability in a channel according to the number of nets of a multi-net in a case ($\mu=\gamma I/\gamma$) of initially setting a weight when performing random frequency hopping (FH) while differently setting the number (ChSAT, I) of idle satellite channels, a ratio ($\alpha$) of the number of idle slots to the total number of slots in a busy satellite channel, and a ratio ($\beta$) of idle duration to the total length of slots in a satellite channel and when performing weighted FH (WFH) according to an embodiment of the present disclosure, a case ($\mu=\gamma I/\gamma-0.1$) where a weight is less than an initial setting value, a case ($\mu=\gamma I/\gamma+0.1$) where a weight is greater than an initial setting value, and a case ($\mu=1$) where a weight is set to a maximum value.

As shown in the graphs of FIGS. 5 to 10, when the shared spectrum of the first communication system 200 is shared by WFH according to an embodiment of the present disclosure, it can be seen that a probability of signal collision in a channel is reduced as compared with the case of performing random FH.

Also, when WFH is performed according to an embodiment of the present disclosure, it can be seen that a probability of signal collision in a channel is reduced when a weight is greater than an initial setting value, rather than when the weight is less than the initial setting value.

Figure 11:
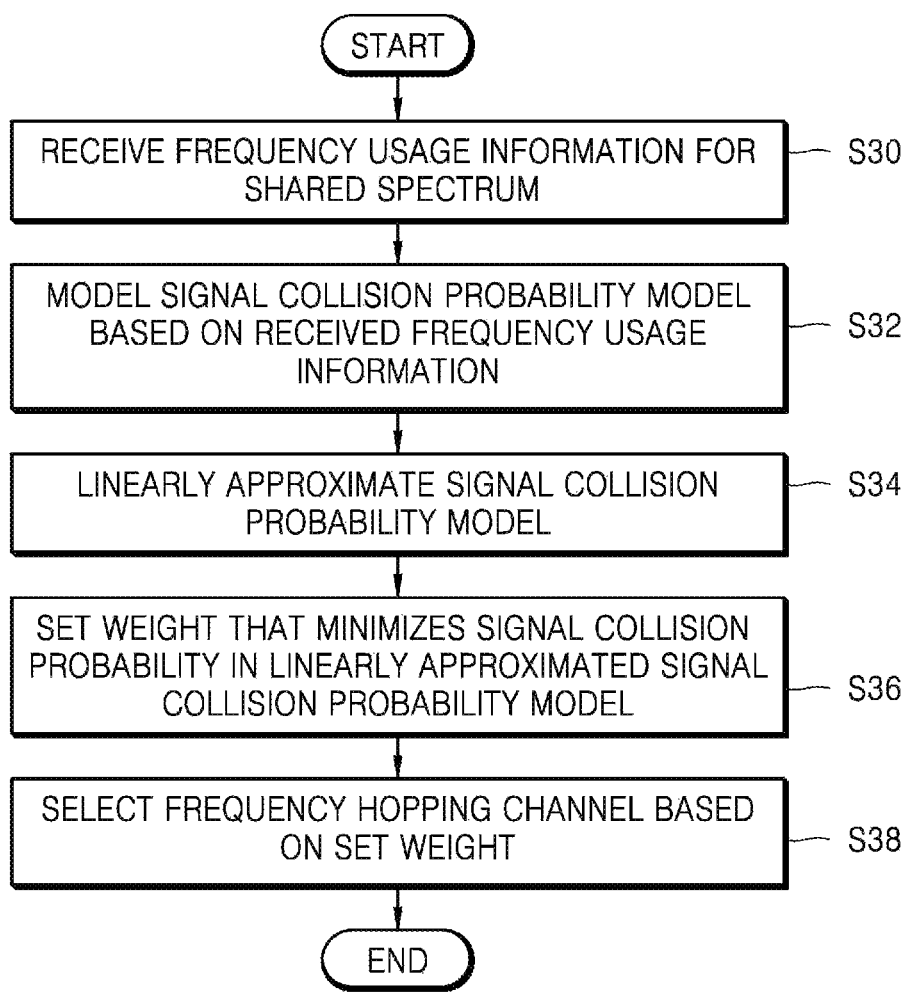
FIG. 11 is a flowchart of a method of setting a weight according to another embodiment, in the method of sharing a spectrum by frequency hopping shown in FIG. 4.

FIG. 11 is a flowchart of a method of setting a weight according to another embodiment, in the method of sharing a spectrum by frequency hopping shown in FIG. 4.

Referring to FIGS. 1, 2, 4, and 11, the NCC 100 may monitor frequency usage information for the first communication system 200 and may transmit the monitored frequency usage information to the second communication system 300.

According to an embodiment, the frequency usage information may include information on a ratio of idle slots (e.g., SAT slot2, SAT slot Ns, etc.) not used by the first communication system 200 in a shared spectrum, and a ratio of idle duration in a slot (e.g., SAT slot1) being used by the first communication system 200 in the shared spectrum.

In operation S30, the second communication system 300 may receive frequency usage information for the shared spectrum of the first communication system 200 received from the NCC 100.

In operation S32, the second communication system 300 may model a signal collision probability model based on the received frequency usage information.

According to an embodiment, the signal collision probability model may be modeled as the following Equation 7.

$$P_C = P_I \cdot P_B \quad \text{[Equation 7]}$$

$P_C$ is a signal collision probability in the total shared spectrum, $P_I$ is a signal collision probability in an unused spectrum of the first communication system 200 in the shared spectrum, and $P_B$ is a signal collision probability in a used spectrum of the first communication system 200 in the shared spectrum.

As shown in Equation 7, the signal collision probability in the total shared spectrum may be modeled on a sum of signal collision probabilities in first channels of the second communication system 300 corresponding to an unused spectrum in the shared spectrum and signal collision probabilities in second channels of the second communication system 300 corresponding to a used spectrum in the shared spectrum.

In particular, $P_B$ in Equation 7 may be modeled as the following Equation 8.

$$P_B = P_{B1} + P_{B2} + P_{B3} \quad \text{[Equation 8]}$$

$P_{B1}$ is a signal collision probability in busy duration (e.g., busy duration of SAT Slot1 (busy) of SAT CH (busy) shown in FIG. 2) in a slot being used by the first communication system 200 in a used spectrum of the shared spectrum. According to an embodiment, the signal collision probability of $P_{B1}$ may mainly include a collision between a signal transmitted from the first communication system 200 and a signal transmitted from the second communication system 300.

$P_{B2}$ is a signal collision probability in idle duration (e.g., idle duration of SAT Slot1 (busy) of SAT CH (busy) shown in FIG. 2) in a slot being used by the first communication system 200 in the used spectrum of the shared spectrum. According to an embodiment, the signal collision probability of $P_{B2}$ may mainly include a signal collision due to multiple access interference between signals transmitted from the first communication system 200.

$P_{B3}$ is a signal collision probability in an idle slot (e.g., SAT Slot2 (idle) of SAT CH (busy) shown in FIG. 2) of the first communication system 200 in the used spectrum of the shared spectrum. According to an embodiment, the signal collision probability of $P_{B3}$ may mainly include a signal collision due to multiple access interference between signals transmitted from the second communication system 300.

In Equation 8, $P_{B1}$ may be modeled as shown in Equation 9, $P_{B2}$ may be modeled as shown in Equation 10, and $P_{B3}$ may be modeled as shown in Equation 11.

$$P_{B1} = (1-\mu) \times (1-\alpha) \times (1-\beta) \quad \text{[Equation 9]}$$

$$P_{B2} = (1-\mu) \times (1-\alpha) \times \beta \times \sum_{i=0}^{\Omega-1} P_{BMAI}(i) \quad \text{[Equation 10]}$$

$$P_{B3} = (1-\mu) \times \alpha \times \sum_{i=0}^{\Omega-1} P_{BMAI}(i) \quad \text{[Equation 11]}$$

In Equation 9 to Equation 11, $\mu$ is a weight, $\alpha$ is a ratio of an idle slot (e.g., SAT slot2, SAT slot Ns, etc.) not used by the first communication system 200 in a shared spectrum included in frequency usage information, and $\beta$ is a ratio of idle duration in a slot (e.g., SAT slot1) being used by the first communication system 200 in the shared spectrum included in the frequency usage information.

$P_{BMAI}$ is a probability of occurrence of multiple access interference in a band used by the first communication system 200 and $\Omega$ is the number of multi-nets operated by the second communication system 300 utilizing the shared spectrum of the first communication system 200.

$P_I$ in Equation 7 may be modeled as the following Equation 12.

$$P_I = \mu \times \sum_{i=0}^{\Omega-1} P_{IMAI}(i) \qquad \text{[Equation 12]}$$

$\mu$ is a weight, $P_{BMAI}$ is a probability of occurrence of multiple access interference in a band not used by the first communication system 200, and $\Omega$ is the number of multi-nets operated by the second communication system 300 utilizing the shared spectrum of the first communication system 200.

$P_{IMAI}$ may be modeled as the following Equation 13, and $P_{BMAI}$ may be modeled as the following Equation 14.

$$P_{IMAI} = \binom{\Omega-i}{i} u^i (1-u)^{\Omega-1-i} \times \left(1 - \left(1 - \frac{1}{\gamma_I}\right)^i\right) \qquad \text{[Equation 13]}$$

$$P_{BMAI} = \binom{\Omega-i}{i} u^{\Omega-1-i} (1-u)^i \times \left(1 - \left(1 - \frac{1}{\gamma_B}\right)^i\right) \qquad \text{[Equation 14]}$$

In Equation 13 and Equation 14, $\gamma_I$ is the number of first channels of the second communication system 300 corresponding to an unused spectrum in a shared spectrum, and $\gamma_B$ is the number of second channels of the second communication system 300 corresponding to a used spectrum in the shared spectrum.

In operation S34, the second communication system 300 may linearly approximate the signal collision probability model (e.g., the signal collision probability model defined by Equation 7 to Equation 14) modeled through operation S32.

According to an embodiment, the second communication system 300 may linearly approximate the signal collision probability model of Equation 13 as shown in the following Equation 15, and the signal collision probability model of Equation 14 as shown in the following Equation 16.

$$\begin{aligned}P_{IMAI} &= \binom{\Omega-i}{i} u^i (1-u)^{\Omega-1-i} \times \left(1 - \left(1 - \frac{1}{\gamma_I}\right)^i\right) \qquad \text{[Equation 15]} \\ &\approx \binom{\Omega-i}{i} u^i (1-u)^{\Omega-1-i} \times \left(1 - \left(1 - \frac{i}{\gamma_I}\right)\right) \\ &\approx \binom{\Omega-i}{i} u^i (1-u)^{\Omega-1-i} \times \left(\frac{i}{\gamma_I}\right) \\ &\approx \frac{i}{\gamma_I} \binom{\Omega-i}{i} u^i (1-u)^{\Omega-1-i}\end{aligned}$$

$$\begin{aligned}P_{BMAI} &= \binom{\Omega-i}{i} u^{\Omega-1-i} (1-u)^i \times \left(1 - \left(1 - \frac{1}{\gamma_B}\right)^i\right) \qquad \text{[Equation 16]} \\ &\approx \binom{\Omega-i}{i} u^{\Omega-1-i} (1-u)^i \times \left(1 - \left(1 - \frac{i}{\gamma_B}\right)\right) \\ &\approx \binom{\Omega-i}{i} u^{\Omega-1-i} (1-u)^i \times \left(\frac{i}{\gamma_B}\right) \\ &\approx \frac{i}{\gamma_B} \binom{\Omega-i}{i} u^{\Omega-1-i} (1-u)^i\end{aligned}$$

Equation 15 and Equation 16 may be expressed in a binomial distribution form, and a portion to be summed may be expressed by an average value of the binomial distribution. Accordingly, Equation 15 may be expressed as the following Equation 17, and Equation 16 may be expressed as the following Equation 18.

$$\sum_{i=0}^{N_{net}-1} P_{IMAI}(i) = \frac{1}{\gamma_I}(\Omega-1)\mu \qquad \text{[Equation 17]}$$

$$\sum_{i=0}^{N_{net}-1} P_{BMAI}(i) = \frac{1}{\gamma_B}(\Omega-1)(1-\mu) \qquad \text{[Equation 18]}$$

When Equation 17 is applied to Equation 12, $P_I$ may be expressed as the following Equation 19.

$$\begin{aligned}P_I &= \mu \times \sum_{i=0}^{\Omega-1} P_{IMAI}(i) \qquad \text{[Equation 19]} \\ &\approx \mu \times \frac{1}{\gamma_I}(\mu-1)\mu\end{aligned}$$

Furthermore, when Equation 18 is applied to Equation 10, $P_{B2}$ may be expressed as the following Equation 20, and when Equation 18 is applied to Equation 11, $P_{B3}$ may be expressed as the following Equation 21.

$$P_{B2} = (1-\mu) \times (1-\alpha) \times \beta \times \frac{1}{\gamma_B}(\Omega-1)(1-\mu) \qquad \text{[Equation 20]}$$

$$P_{B3} = (1-\mu) \times \alpha \times \frac{1}{\gamma_B}(\Omega-1)(1-\mu) \qquad \text{[Equation 21]}$$

When Equation 19 to Equation 21 are applied to Equation 7, $P_C$ may be expressed as the following Equation 22.

$$P_C = \frac{\mu^2}{\gamma_I}(\Omega-1) + \qquad \text{[Equation 22]}$$
$$(1-\mu) \times \left\{(1-\alpha)(1-\beta) + (\alpha+\beta-\alpha\beta)(\Omega-1)\frac{(1-\mu)}{\gamma_B}\right\}$$

In operation S36, the second communication system 300 may set a weight (e.g., weight ($\mu$)) that minimizes a signal collision probability in the signal collision probability model (e.g., the signal collision probability model defined by Equation 22) linearly approximated through operation S34.

According to an embodiment, the signal collision probability model linearly approximated through operation S34 may be expressed as a quadratic function with respect to weight ($\mu$)) as shown in Equation 22, and may set the weight ($\mu$) at a point where $P_C$ becomes 0 after differentiating Equation 22 with respect to the weight ($\mu$) as a weight value that minimizes the signal collision probability.

In this case, Equation for obtaining the weight ($\hat{\mu}$) may be expressed as the following Equation 23.

$$\hat{\mu} = \frac{(\alpha+\beta-\alpha\beta)\left(1 - \frac{2(\Omega-1)}{\gamma_B}\right) + 1}{2(\Omega-1)\left(\frac{1}{\gamma_I} + \frac{(\alpha+\beta-\alpha\beta)}{\gamma_B}\right)} \qquad \text{[Equation 23]}$$

According to an embodiment, when a value of the weight ($\hat{\mu}$) derived according to Equation 23 exceeds an upper limit value (e.g., 1), the value of the weight may be set to the upper limit value (e.g., 1).

In operation S38, the second communication system 300 may select a frequency hopping channel based on the weight set through operation S36.

According to an embodiment, the second communication system 300 may generate an arbitrary variable x between 0 and 1 having uniform distribution, compare the generated variable x with a set value of a weight, and select a channel to be used for communication by frequency hopping from among the first channels and the second channels.

For example, when the generated variable x is less than the set value of the weight, the second communication system 300 may select any one of the first channels as a frequency hopping channel, and when the generated variable x is equal to or greater than the set value of the weight, the second communication system 300 may select any one of the second channels as a frequency hopping channel.

According to an embodiment, an arbitrary first channel may be selected by applying an identical probability to each of the first channels when a frequency hopping channel is selected from among the first channels, and an arbitrary second channel may be selected by applying an identical probability to each of the second channels when a frequency hopping channel is selected from among the second channels.

According to an embodiment, operations S30 to S38 may be performed by the NCC 100.

Figure 12:
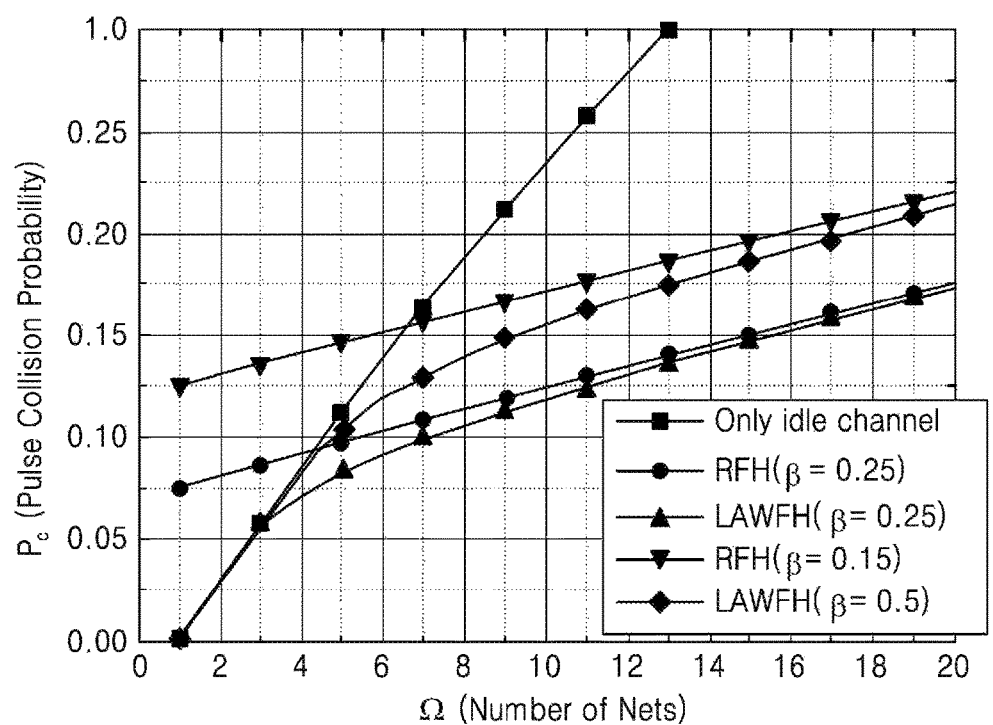
FIG. 12 is a graph showing comparison of a signal collision probability in a case of setting a weight according to the method shown in FIG. 11 and a collision probability in a case of setting a weight according to the method shown in FIG. 4, according to various setting conditions.

FIG. 12 is a graph showing comparison of a signal collision probability in a case of setting a weight according to the method shown in FIG. 11 and a collision probability in a case of setting a weight according to the method shown in FIG. 4, according to various setting conditions.

Referring to FIGS. 4, 11, and 12, signal collision probabilities of when a weight is set to 0 while a value of the ratio ($\beta$) of idle duration in a slot being used by the first communication system 200 in a shared spectrum included in frequency usage information is differently set to 0.25 and 0.15, of when frequency hopping (Only idle channel in FIG. 12) is performed based on a weight set to 0, and of when frequency hopping (RFH in FIG. 12) is performed based on a weight determined by a ratio of the number of first channels and the number of second channels according to a weight setting method described in FIG. 4, and of when WFH (LAWFH in FIG. 12) is performed according to a weight setting method described in FIG. 11 are compared to each other.

As can be seen in FIG. 12, the signal collision probability of when LAWFH is performed according to the weight setting method described in FIG. 11 is lower than that of when RFH is performed according to the weight setting method described in FIG. 4 or when a weight is simply set to 0.

According to the method and the communication system according to the inventive concept, a second communication system may effectively set a selection criterion of a channel to be used for communication by frequency hopping based on frequency usage information for a shared spectrum of a first communication system.

Furthermore, the method and the communication system according to the inventive concept may measure a performance index of the second communication system sharing a frequency of the first communication system and may change a channel selection criterion according to a performance index required in the second communication system according to the measured performance index.

In addition, the method and the communication system according to the inventive concept may minimize degradation of multi-net performance due to signal collision even after sharing a spectrum by frequency hopping by setting a weight that minimizes a sum of signal collision probabilities based on frequency usage information.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A method of sharing a spectrum by frequency hopping, the method comprising:
receiving frequency usage information for a shared spectrum of a first communication system;
setting a weight for determining a ratio of channels to be used for communication by frequency hopping of a second communication system from among first channels of the second communication system corresponding to an unused spectrum in the shared spectrum and second channels of the second communication system corresponding to a used spectrum in the shared spectrum, based on the received frequency usage information; and
selecting a frequency hopping channel from among the first channels and the second channels based on the set weight,
wherein the shared spectrum of the first communication system comprises:
satellite channels for satellite communication of the first communication system, and guard bands for preventing interference between the satellite channels.

2. The method of claim 1, wherein the first communication system is a communication system for providing a fixed satellite service (FSS), and
the shared spectrum is an X-band spectrum.

3. The method of claim 2, wherein the second communication system is a communication system for providing a tactical data link (TDL).

4. The method of claim 1, the frequency usage information comprises:
information on a busy satellite channel and an idle satellite channel from among the satellite channels.

5. The method of claim 4, wherein the unused spectrum in the shared spectrum of the first communication system comprises the guard bands and the idle satellite channel from among the satellite channels, and
the used spectrum in the shared spectrum of the first communication system comprises the busy satellite channel from among the satellite channels.

6. The method of claim 5, wherein the setting of the weight comprises:
initially setting the weight to correspond to a ratio of the number of the first channels to the number of the second channels.

7. The method of claim 6, further comprising:
measuring a performance index according to spectrum sharing of the second communication system based on the initially set weight; and
updating the weight whether the measured performance index meets a reference performance index required in the second communication system.

8. The method of claim 7, wherein the performance index comprises:
the number of multi-nets required in the second communication system.

9. The method of claim 8, wherein the performance index comprises:
the number of the multi-nets required in the second communication system and a message error rate (MER).

10. The method of claim 9, wherein the updating of the weight comprises:
updating the weight to increase a value of the weight.

11. The method of claim 10, wherein, as the weight is updated to increase the value of the weight, the selecting of a frequency hopping channel from among the first channels and the second channels is set such that a ratio of selecting the first channels as the frequency hopping channel is increased.

12. A communication node included in a communication system for sharing a spectrum of another communication system by frequency hopping, the communication node comprising:
a memory to store instructions; and
a processor, coupled to the memory, to facilitate execution of the instructions to perform operations comprising:
receiving frequency usage information for the shared spectrum of the other communication system;
setting a weight for determining a ratio of channels to be used by frequency hopping from among first channels corresponding to an unused spectrum in the shared spectrum and second channels corresponding to a used spectrum in the shared spectrum based on the received frequency usage information; and
selecting a frequency hopping channel from among the first channels and the second channels based on the set weight,
wherein the shared spectrum of the communication system comprises:
satellite channels for satellite communication of the communication system, and guard hands for preventing interference between the satellite channels.

13. The communication node of claim 12, wherein the other communication system is a communication system for providing a fixed satellite service (FSS), and
the shared spectrum is an X-band spectrum.

14. The communication node of claim 13, wherein the communication system is a communication system for providing a tactical data link (TDL) comprising a multi-net.

* * * * *